United States Patent
Letzbor et al.

(10) Patent No.: US 12,097,580 B2
(45) Date of Patent: Sep. 24, 2024

(54) PROCESS FOR MANUFACTURING A VEHICLE HINGE AND APPARATUS FOR MAKING A HINGE

(71) Applicant: AGCO International GmbH, Neuhausen (CH)

(72) Inventors: Manfred Letzbor, Marktoberdorf (DE); Peter Schuhladen, Marktoberdorf (DE); Mathias Reutner, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 0 days.

(21) Appl. No.: 18/558,652

(22) PCT Filed: Jun. 1, 2022

(86) PCT No.: PCT/IB2022/055113
§ 371 (c)(1),
(2) Date: Nov. 2, 2023

(87) PCT Pub. No.: WO2022/269392
PCT Pub. Date: Dec. 29, 2022

(65) Prior Publication Data
US 2024/0238919 A1    Jul. 18, 2024

(30) Foreign Application Priority Data
Jun. 23, 2021  (GB) ..................................... 2109004

(51) Int. Cl.
*B23P 11/02* (2006.01)
*B21K 25/00* (2006.01)
(Continued)

(52) U.S. Cl.
CPC .............. *B23P 11/02* (2013.01); *B21K 25/00* (2013.01); *B23P 19/02* (2013.01); *F16C 11/045* (2013.01)

(58) Field of Classification Search
CPC ......... F16C 11/045; B23P 19/02; B23P 11/02; B21K 25/00
See application file for complete search history.

(56) References Cited

U.S. PATENT DOCUMENTS

| | | | |
|---|---|---|---|
| 1,453,085 A | 4/1923 | Strickland | |
| 3,831,257 A * | 8/1974 | Boggs | .................... B23K 9/028 219/52 |

(Continued)

FOREIGN PATENT DOCUMENTS

SU    1516202 A2 *  6/1987

OTHER PUBLICATIONS

UK Intellectual Property Office, Search report for related UK Application No. GB2109004.8, dated Dec. 9, 2021, 3 pages.

(Continued)

*Primary Examiner* — Bayan Salone
(74) *Attorney, Agent, or Firm* — Jeffrey S. Ellsworth

(57) ABSTRACT

A hinge is formed having a hinge bolt and a U-shaped hinge support with a hinge base, an upper limb and a lower limb. The method includes placing the hinge support in manufacturing apparatus having a support base, a workpiece holder having a fixed clamping jaw and a movable clamping jaw, a tool die which includes a tubular die support and a press contour, and a press piston. The press piston is movable along a first axis to apply an adjustable pressing force on the hinge support. The support base includes cylindrical guide shafts to movably guide the workpiece holder along a second axis. The hinge support is placed relative the workpiece holder such that upper edges of the upper limb are brought into contact with a first recess in the fixed clamping jaw and a second recess in the movable clamping jaw.

11 Claims, 11 Drawing Sheets

(51) Int. Cl.
*B23P 19/02* (2006.01)
*F16C 11/04* (2006.01)

(56) References Cited

U.S. PATENT DOCUMENTS

| | | | | |
|---|---|---|---|---|
| 5,501,421 A * | 3/1996 | Kluting | ............... | F16C 11/0614 |
| | | | | 403/162 |
| 6,728,993 B1 * | 5/2004 | Murayama | ............... | F16C 17/02 |
| | | | | 16/342 |
| 2001/0003895 A1 * | 6/2001 | Bedford | ................. | B21L 9/065 |
| | | | | 59/7 |
| 2019/0194989 A1 * | 6/2019 | Suesada | .................... | E05D 3/02 |

OTHER PUBLICATIONS

European Patent Office, Search report for related PCT Application No. PCT/IB2022/055113, dated Oct. 11, 2022, 14 pages.

* cited by examiner

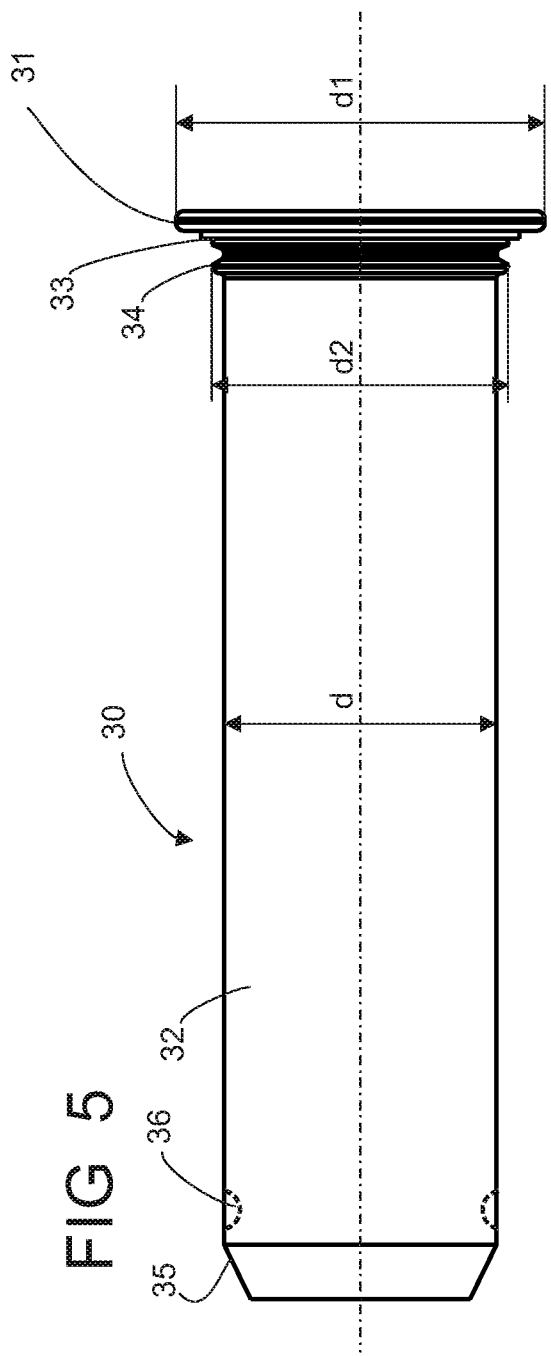

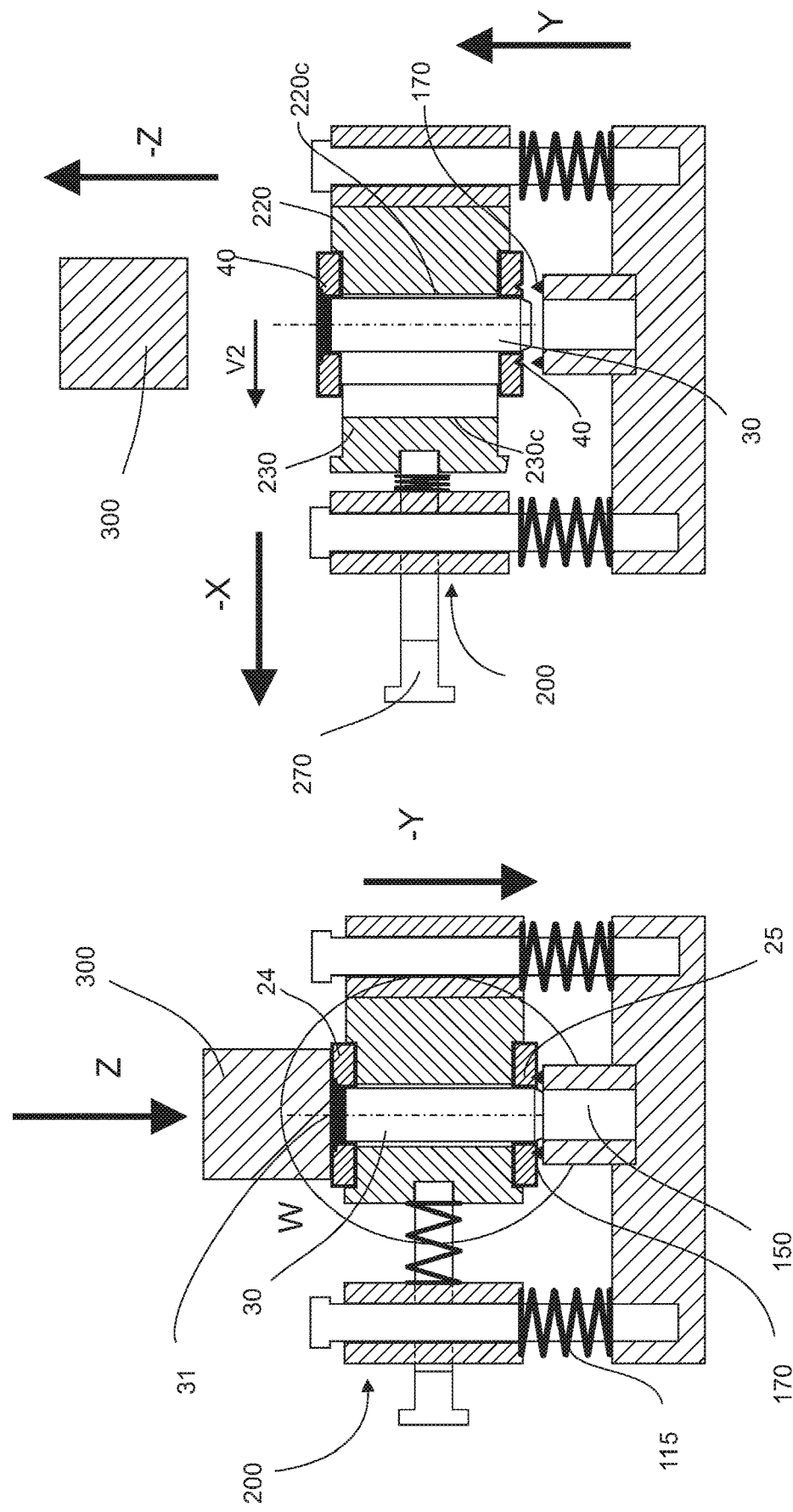

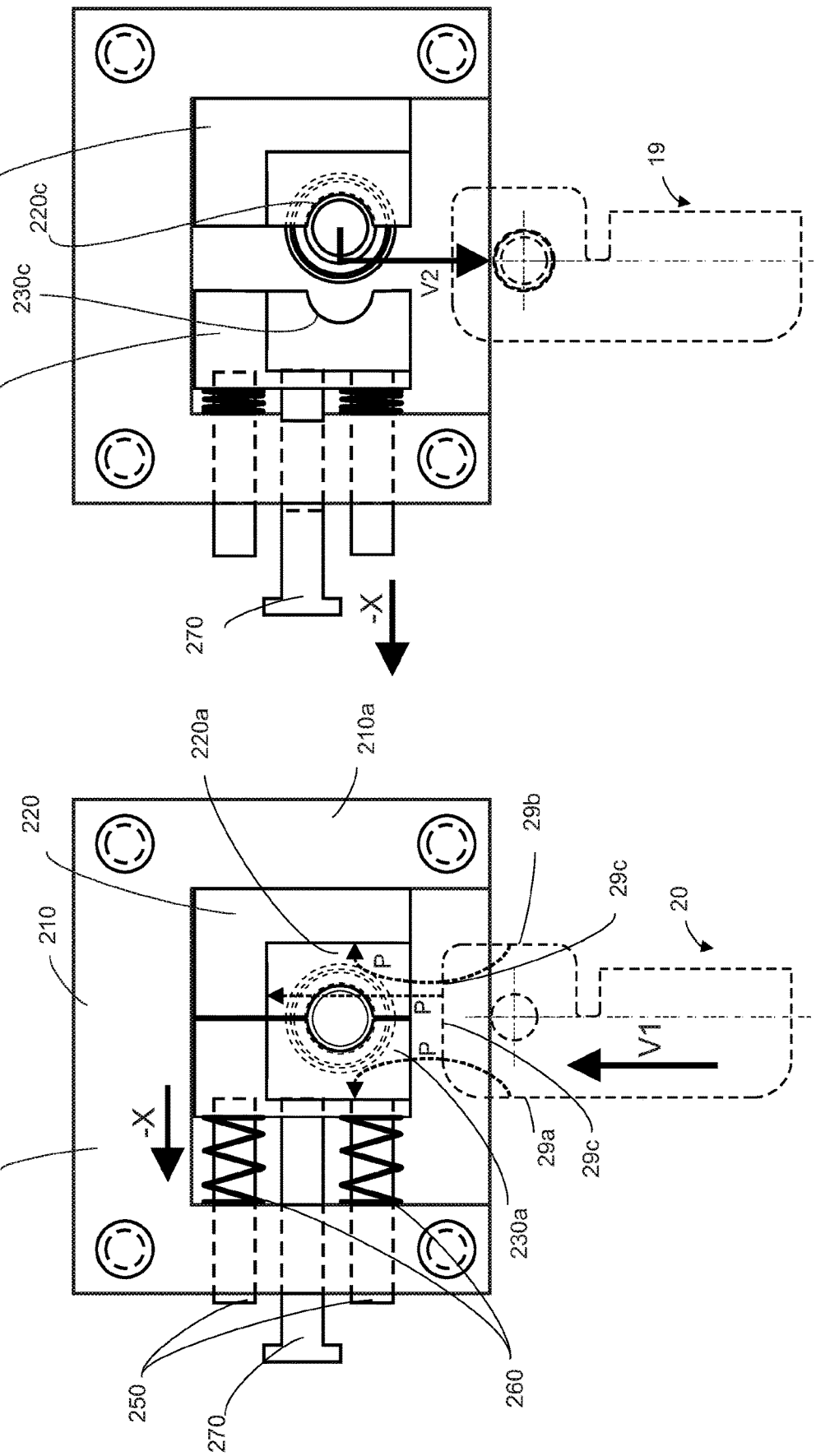

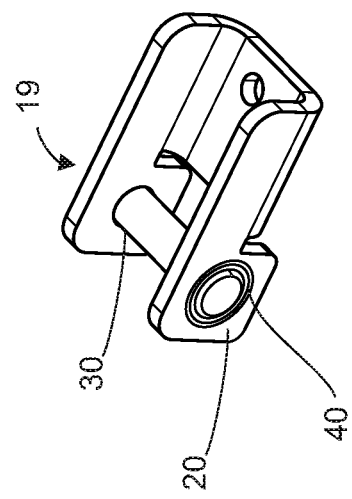
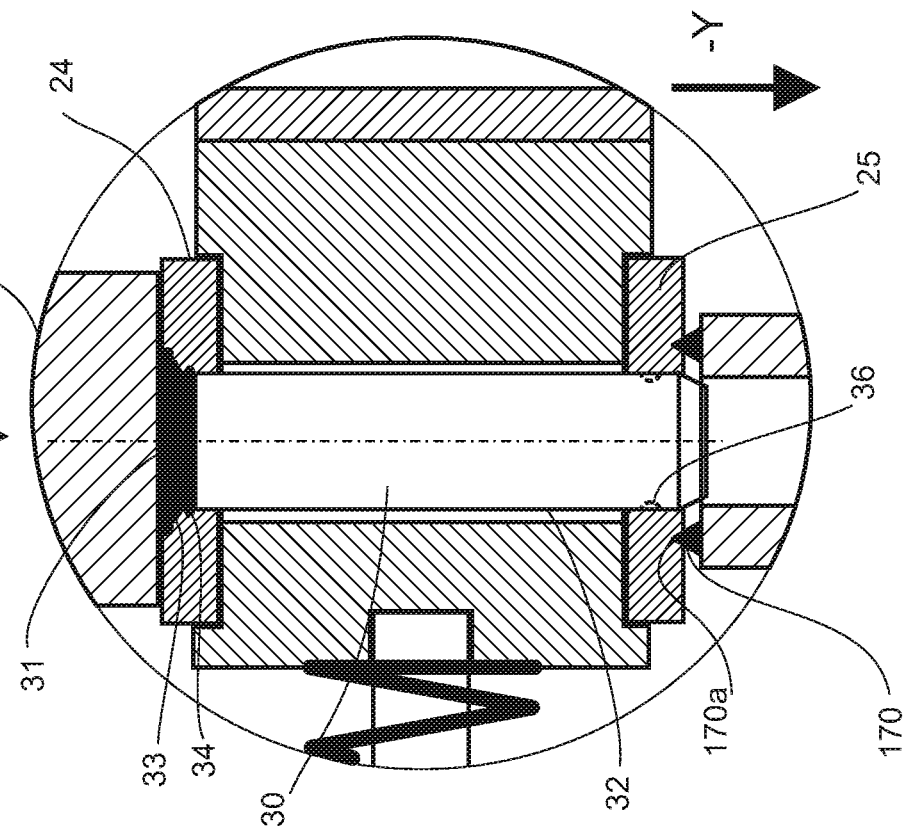

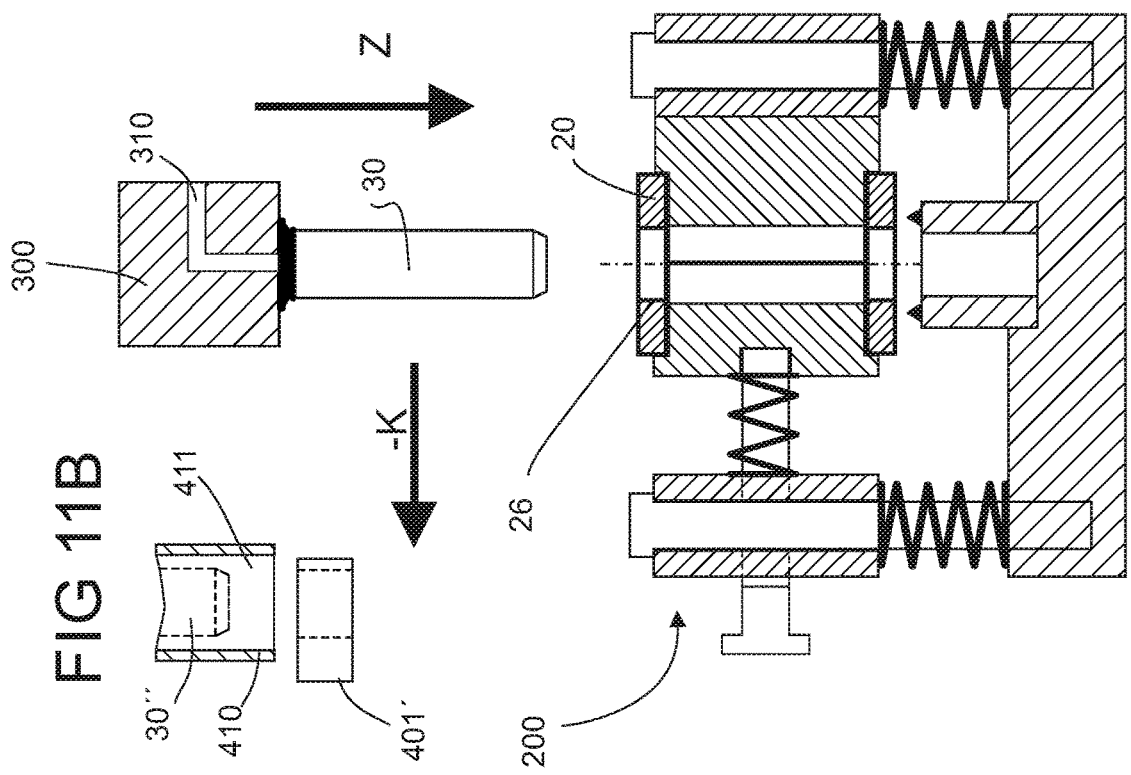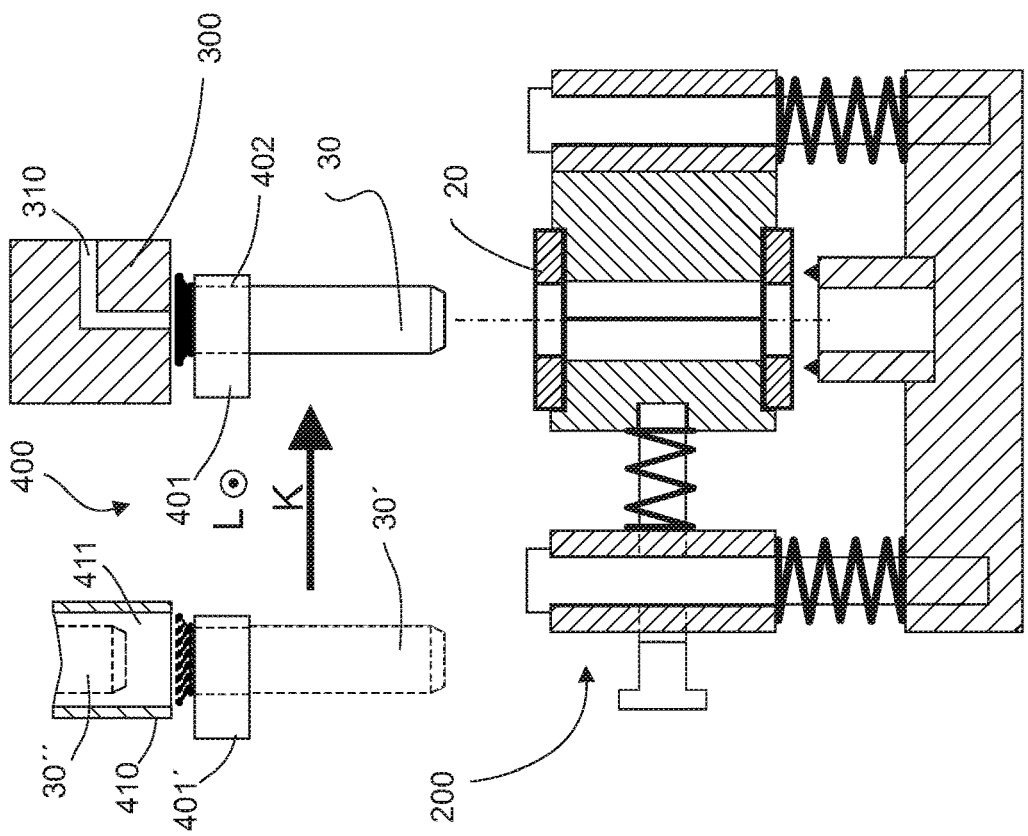

PROCESS FOR MANUFACTURING A VEHICLE HINGE AND APPARATUS FOR MAKING A HINGE

BACKGROUND OF THE INVENTION

Field of Invention

This Invention relates to a manufacturing apparatus and a process method for manufacturing a hinge for use in a vehicle such an agricultural vehicle.

Description of Related Art

It is common to use hinges to pivotably attach doors, windows or covers to vehicle bodies. One example may be the roof window of a tractor cab. Another example may be a service cover of a harvesting machine such as a combine or forage harvester. For example, FIG. 1 shows a typical tractor 1 having a cab 2. The cab 2 includes a roof 3 to which a roof window 4 is pivotably mounted by means of a hinge 10 for the purpose of opening and closing said roof window 4.

FIG. 2 shows a known design of a hinge 10 having a generally u-shaped hinge body 11 and a hinge bolt 12. The hinge bolt 12 is connected to both a first limb 11b and a second limb 11c of hinge body 11 to form a two-shear connection with the bolt extending between the two limbs. For a two-shear connection, it is important that the connection between the bolt and each limb be durable enough so that the limb does not bend during operation under anticipated external forces. In terms of the connection between the bolt and limbs, a form-fit connection is generally preferred compared to a press-fit connection. Different ways to form this two-shear connection are described below.

FIG. 3A depicts a hinge according FIG. 2 in which the u-shaped hinge body 11 is manufactured by laser cutting a flat sheet metal part. The hinge body 11 includes a hinge base 11a for assembly to a vehicle body (not shown) via bores 11f and the first limb 11b and the second limb 11c which are bent upwards by a folding or pressing tool. For connecting the hinge bolt 12 to the hinge body 11, the first limb 11b and the second limb 11c are provided with bolt bores 11d, 11e through which the hinge bolt 12 engages. According to a first known method, the hinge bolt 12 is connected to the hinge body 11 by plug welding, which means that the weldseam is placed inside the bolt bores 11d, 11e. Welding is a quite costly method for connecting parts. As the welding must be done on both sides and limbs 11b, 11c, the pieces must be turned for each weldseam, or means with two welding heads must be used. This increases the costs of using this method.

FIG. 3B depicts a further known method using cold forming instead of welding. The hinge 10 has a hinge body 11 and a hinge bolt 15. As hinge body 11 remains the same as described in FIG. 3A, details of the hinge body 11 are not repeated. The hinge bolt 15 is provided with a first end having a bolt head 15a and a second end 15b. For connecting, the hinge bolt 15 is inserted into the bolt bores 11d, 11e of the hinge body 11. Thereby, the bolt head 15a engages with the first limb 11b to ensure proper position of the bolt 15. A press tool is then used to deform the second end 15b (as indicated with dotted lines 15c) to engage with the second limb 11c. The press force applied by the press tool must be carefully chosen to ensure fixation but to avoid deformation of the second limb 11c which could impair functionality. If the hinge 10 is used for light duties wherein the wear and force requirements regarding hinge bolt 15 are minor, the hinge bolt 15 may be made from a suitable alloy to enable proper deformation. This may be suitable for light weight parts such as small covers in the interior of the cab. Such hinges are also known for use in furniture manufacturing. However, if the hinge 10 is intended for heavy duty use, such as heavy roof windows or large-scale sheet metal covers of agricultural harvesters, the hinge bolt 15 must be wear resistant and bear higher loads. Therefore, such a hinge bolt 15 may be made of hardened or high-tensile material. In this case, the press force must be very high to provide the deformation as indicated with dotted lines 15c. This increases costs due to higher pressing cycles and press tool investment.

FIGS. 3C and 3D depicts a further known example of an assembly 16 wherein a TPS bolt 18 is connected to a base part 17. The bolt 18 is pressed into the base part 17. To ensure sufficient mechanical connection and as shown with FIG. 3D, the bolt 18 is provided with a cylindrical bolt head 18a of a diameter d1 that is greater than the diameter d of the main bolt 18. The cylindrical bolt head 18a extends into a chamfer 18b followed by a radial contour 18c being of greater diameter d2 than the diameter d of the main bolt 18.

The above described methods for manufacturing a heavy duty hinge either suffer from high costs if welding or high pressure force. It is therefore desirable to provide a cost effective method and apparatus with low investment costs and minimum manual handling during manufacturing.

OVERVIEW OF THE INVENTION

In one embodiment, the invention is directed to a method for forming a hinge using manufacturing apparatus. The hinge has a hinge bolt and a U-shaped hinge support with a hinge base, an upper limb and a lower limb, with the upper limb having upper edges and a bolt bore, and the lower limb having lower edges and a bolt bore. The hinge bolt engages the hinge base through bolt bores. The hinge bolt has a main cylindrical portion 32 and at one end, a bolt head 31, wherein the bolt head 31 has a greater diameter d1 compared to a diameter d of main cylindrical portion 32. The hinge bolt 30 has a stepped tapering 33 adjacent the bolt head. The tapering may alternatively conical. The cylindrical portion 32 further has a protrusion 34 extending radially with a greater diameter d2 compared to the diameter d of the main cylindrical portion 32. The method includes placing the hinge support in manufacturing apparatus 100. The manufacturing apparatus has a support base 105, a workpiece holder 200 having a fixed clamping jaw 220 and a movable clamping jaw 230, a tool die 150 which includes a tubular die support 160 and a press contour 170, and a press piston 300. The press piston is movable along a first axis Z to apply an adjustable pressing force on the hinge support. The support base 105 further includes cylindrical guide shafts 110 to movably guide the workpiece holder 200 along a second axis Y. The hinge support is placed relative the workpiece holder such that upper edges 29a, 29b, 29c of the upper limb 24 of the hinge support 20 are brought into contact with a first recess 220a in the fixed clamping jaw 220 and a second recess 230a in the movable clamping jaw 230.

The method includes inserting the hinge bolt 30 into the hinge support 20, guided by a semicircular bore 220c in the fixed clamping jaw 220 and a semicircular bore 230c in the movable clamping jaw 230, until the protrusion 34 of the hinge bolt 30 stops the insertion of hinge bolt 30 by contacting edges of the bolt bore 26 in the upper limb 24 of the hinge support 20. The press piston 300 continues to move along the first axis Z so that it contacts the bolt head 31. The press piston 300 further moves along the axis Z such that force exerted by press piston 300 moves the workpiece holder 200 with hinge support 20 and hinge bolt 30 mounted thereon against the force of at least one spring 115 along the second axis Y so that the lower limb 25 contact the press contour 170 of tool die 150.

The method also includes deforming the upper limb 24 of the hinge support 20 by further moving the press piston 300 along the axis Z such that the upper limb 24 is deformed by the main cylindrical portion 32, the stepped tapering 33 and the protrusion 34. The deformation proceeds in three steps, such that when the protrusion 34 engages into the bore 26, deformed material of the upper limb 24 is initially forced radially outwards, then after further downwards movement, the stepped tapering 33 engages and deformed material of the upper limb 24 is forced back and radially inwards, and after further downwards movement, the cylindrical portion 32 and thereby the complete bolt head 31 engages the upper limb 24 and deformed material is pressed downwards towards the protrusion 34 to enclose the bolt head 31 in a form-fit connection.

The method also includes deforming the lower limb 25 of the hinge support 20 with downward movement of the press piston 300 such that the press contour 170 of tool die 150 deforms the lower limb 25. The bolt bore 27 has an initial diameter greater than the diameter d of the main cylindrical portion 32 of hinge bolt 30, and the press contour 170 is tapered towards the lower limb 25. The edges of bore 230c forces deformed material of the lower limb 25 radially inwards so that the deformed material comes into press-fit connection with the main cylindrical portion 32 of the hinge bolt 30.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein:

FIG. 5 illustrates a plan view of a second part of the hinge;

FIG. 6A shows a front view and FIG. 6B sows a top view;

FIGS. 7A to 7F illustrates the steps of the manufacturing process and method;

FIGS. 8A and 8B illustrate top views of the manufacturing apparatus during the selected steps of the manufacturing process shown in FIGS. 7A and 7F;

FIG. 9 shows a detail W of FIG. 7E;

FIG. 10 is a perspective view of the hinge; and

FIGS. 11A and 11B illustrate the manufacturing apparatus during additional or alternative steps of the manufacturing process and method.

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
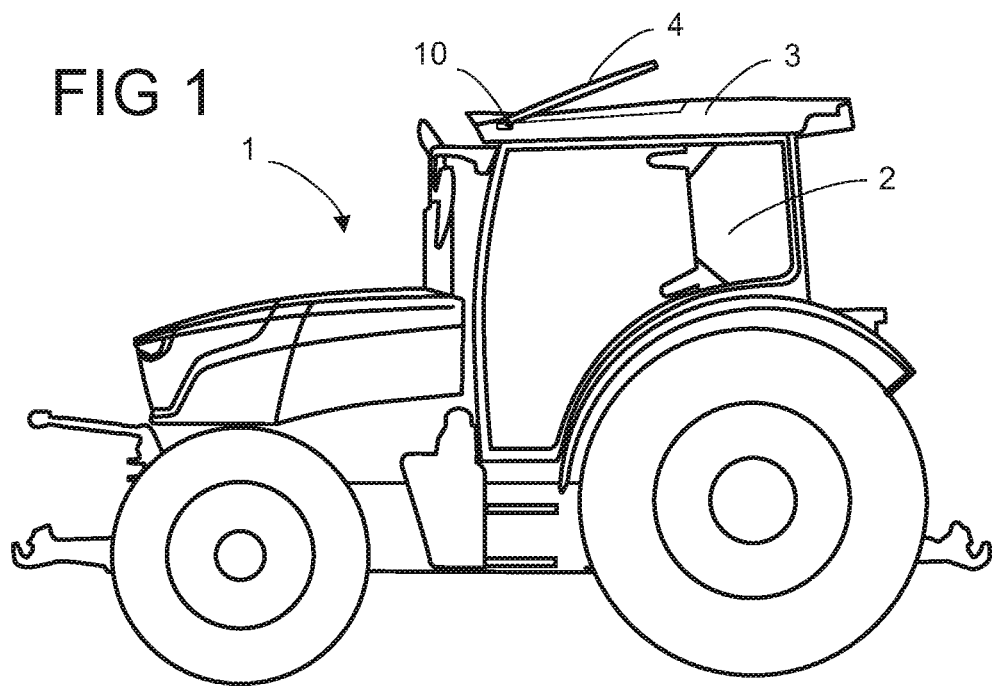
FIG. 1 depicts a tractor having a cab and a roof window according prior art.
Figure 2:
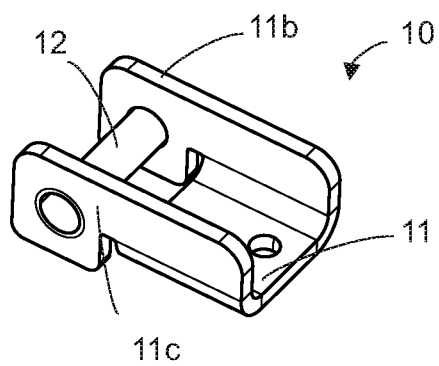
FIG. 2 illustrates perspective view of a hinge known in the art.
Figure 3C:
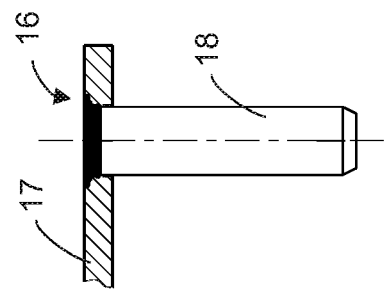
FIGS. 3A to 3D illustrate manufacturing methods of hinges known in the art.
Figure 3D:
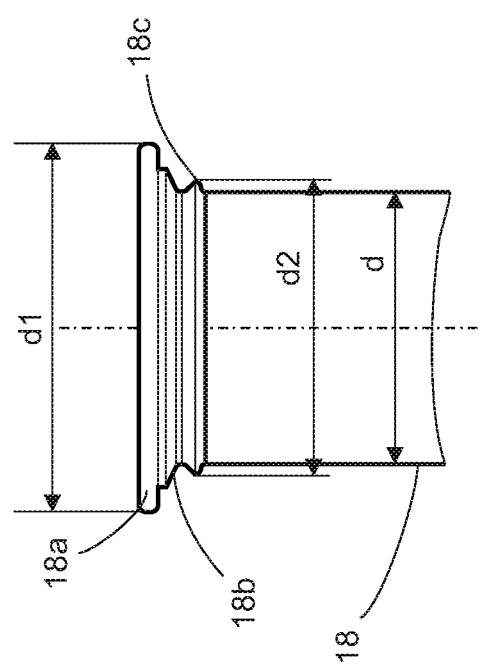
Figure 3A:
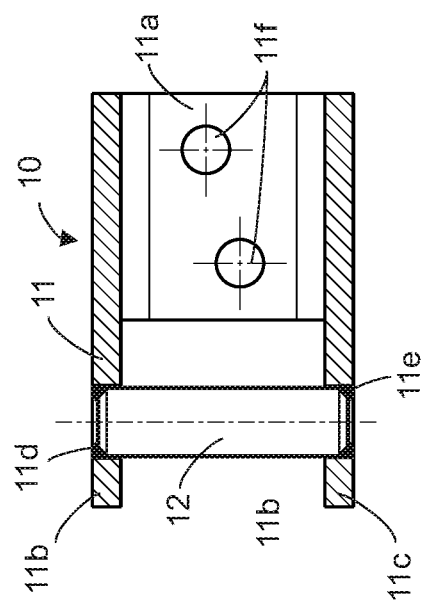
Figure 3B:
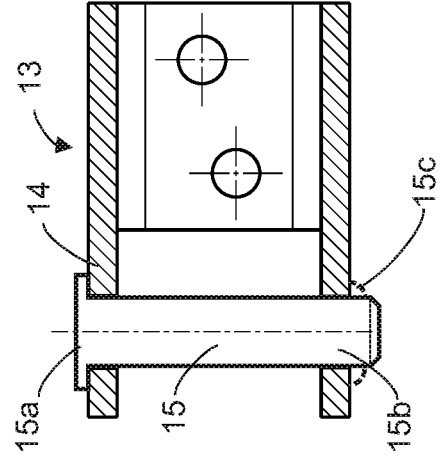
Figure 4B:
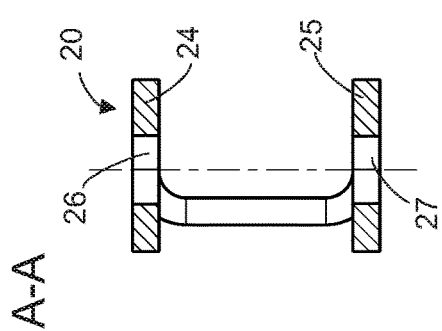
FIGS. 4A to 4D illustrate different views a first part of a hinge.
Figure 4D:
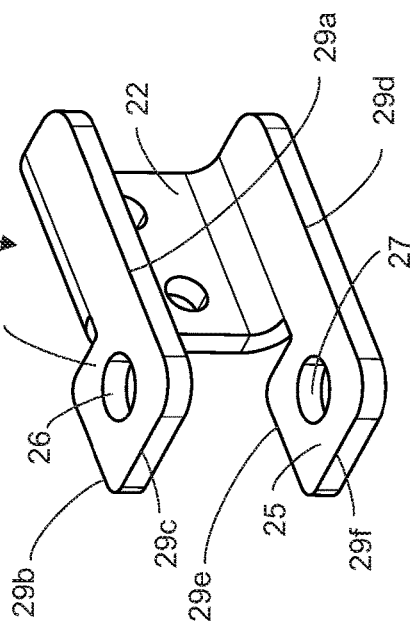
Figure 4A:
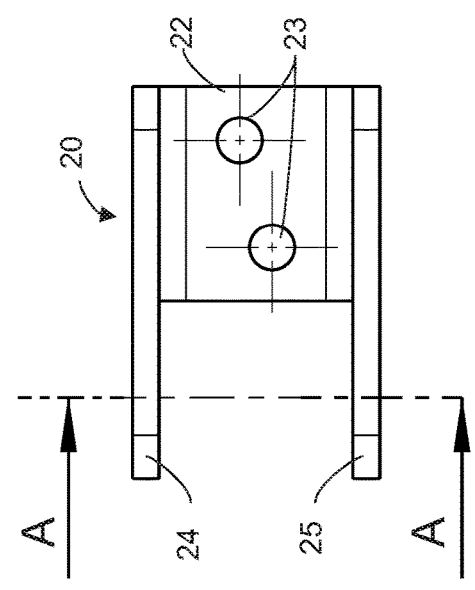
Figure 4C:
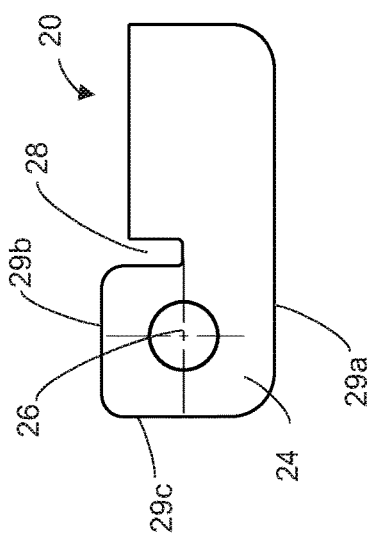

Turning to the figures, wherein like reference numerals represent like elements throughout the several views, FIGS. 4A-4D and FIG. 5 illustrate the components of a hinge 19. FIG. 4A, 4B, 4C show plane ISO views and FIG. 4D shows a perspective view of a u-shaped sheet metal hinge support 20 of the hinge 19. The hinge support 20 includes a hinge base 22 for assembly to a vehicle body (not shown) via bores 23 for screw attachment, and an upper limb 24 and a lower limb 25, which are bent upwards by a folding or pressing tool using any known means. Upper limb 24 and the lower limb 25 are provided with bolt bores 26, 27 through which a hinge bolt 30 (FIG. 5) engages. Bolt bores 26, 27 may be provided with different diameters due to their purpose described below. The hinge support 20 is desirably made of a low-tensile standard steel type suitable for folding or pressing or other cold forming, low force manufacturing methods.

The shown hinge support 20 is furthermore provided with a cut-out 28 to the limbs 24, 25 to be bent upwards close to the position of bolt bores 26, 27. Furthermore, limbs 24, 25 are provided with laser cut edges 29a, 29b, 29c which are referred to below.

With reference to FIG. 5, the hinge bolt 30 is provided with a bolt head 31 and a main cylindrical portion 32. The bolt head 31 has a greater diameter d1 compared to the diameter (indicated with d) of main cylindrical portion 32. The hinge bolt 30 may be available as a standard part for pressing into a sheet metal part and known as TPS™ bolts. These bolts are typically used for single-shear, self-clinching connection to be pressed in one bore of a sheet metal part. The hinge bolt has a stepped tapering 33 from the underside of the bolt head 31 extending toward the cylindrical portion 32. Further towards the cylindrical portion 32, the hinge bolt has a protrusion 34 that extends radially such that it has a greater diameter d2 compared to the diameter d of the main cylindrical portion 32. On the opposite end of hinge bolt 30, a chamfer 35 is provide to ease insertion of the hinge bolt 30 into the bores 26, 27. The hinge bolt 30 is used as the fulcrum to which a door, window or other member to be hingedly attached as would be understood by those skilled in the art. The hinge bolt 30 is desirably made of hardened or high-tensile material.

Figure 6A:
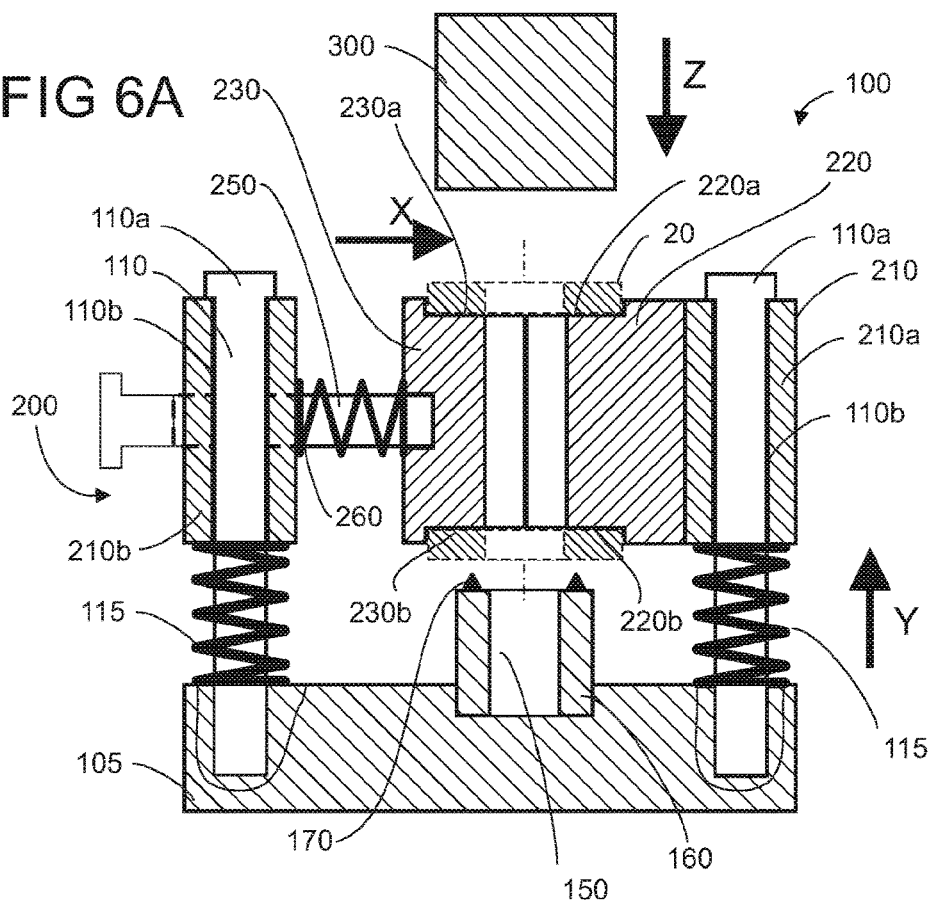
FIGS. 6A and 6B illustrates a views of a manufacturing apparatus to produce the hinge, whereby
Figure 6B:
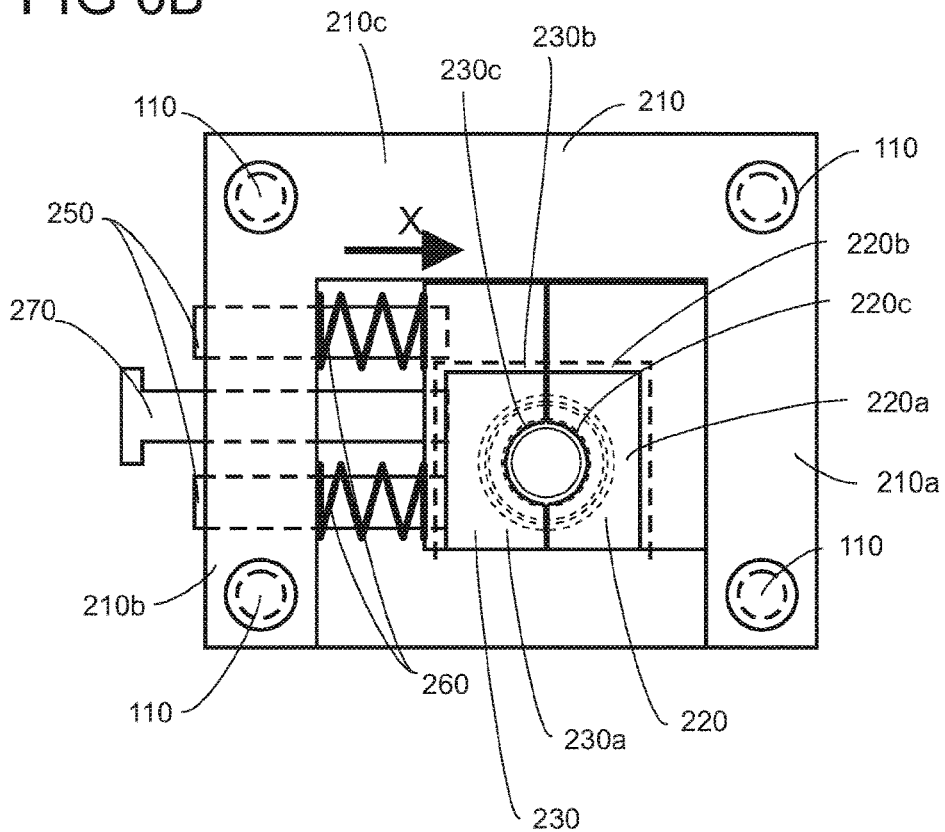

Turning now to FIGS. 6A and 6B, a manufacturing apparatus 100 is now described for connecting the hinge support 20 and hinge bolt 30 to form a two-shear connection. FIG. 6A and FIG. 6B depict simplified representation of the manufacturing apparatus 100 in the front view (FIG. 6A) and the top view (FIG. 6B), wherein, screw connections are omitted from the views for clarity reasons and described instead.

Manufacturing apparatus 100 firstly includes a support base 105, which is used to assemble the apparatus 100 to a suitable carrier for a pressing machine which is not shown in detail. The pressing machine includes a press piston 300 which is movable during the pressing process along direction indicated with arrow Z to apply an adjustable pressing force as described below.

The support base 105 further includes four cylindrical guide shafts 110 provided to movably guide a workpiece holder 200 along the direction indicated with arrow Y. The workpiece holder 200 is forced in an upwards direction by four first springs 115 and kept in the upwards direction by guide shaft head 110a having a larger diameter then the guide portion 110b of guide shaft 110. The support base 105 further takes a tool die 150 which includes a tubular die support 160 and a press contour 170. Tubular die support 160 and a press contour 170 are produced as one piece by turning operation and a subsequent hardening process to increase wear resistance, The support base 105 is positioned and relative to the to the pressing machine (not shown in detail) to ensure that during the pressing process, the press contour 170 is coaxially aligned with the press piston 300 to ensure concentric force application as explained below.

The workpiece holder 200 serves the purpose of releasably fixing the hinge support 20 during the manufacturing process. The workpiece holder 200 is provided with a main frame part 210 which is generally u-shaped to enclose and support further components of the workpiece holder 200. A first portion 210a of the frame part 210 is provided to take a first, fixed clamping jaw 220 by screw connection (not shown). A second, movable clamping jaw 230 is movably assembled to a second portion 210b of the frame part 210. First portion 210a and second portion 210b are connected via a transverse portion 210c. Both first, fixed clamping jaw 220 and second, movable clamping jaw 230 are provided with machined, first recesses 220a, 230a which are brought into matching contact with the upper edges 29a, 29b, 29c (shown in FIG. 4D) of the hinge support 20 to ensure desired positioning, especially an initial rough coaxial alignment of bores 26, 27 with press piston 300 and press contour 170. Further, second recesses 220b, 230b may be provided on the opposite side with a geometry slightly larger than the geometry of recesses 220a, 230a to consider the fact that during folding or pressing, the limbs 24, 25 of hinge support 20 may not be exactly aligned so that lower edges 29d, 29e, 29f do not exactly match with upper edges 29a, 29b, 29c (shown in FIGS. 4C and 4D)

Furthermore, the fixed clamping jaw 220 and the movable clamping jaw 230 are additionally provided with semicircular bores 220c, 230c through which hinge bolt 30 can extend during the manufacturing process as explained below. Semicircular bores 220c, 230c are coaxially aligned with the press contour 170 and the press piston 300 during pressing process.

To enable the movement (along a direction indicated with arrow X) of the movable clamping jaw 230 within the main frame part 210, two cylindrical guide rails 250 are provided. The second, movable clamping jaw 230 is forced into the closed (and shown position in FIGS. 6A, 6B) by two springs 260. For releasing the workpiece and hinge support 20, a handle 270 is fixedly connected to the clamping jaw 230 to move it in a direction counterwise to direction indicated with arrow X.

Further details of the manufacturing apparatus 100 are explained below in conjunction with the following embodiment of process steps described with reference to FIGS. 7A-7F and FIGS. 8A-8B.

Figure 7A:
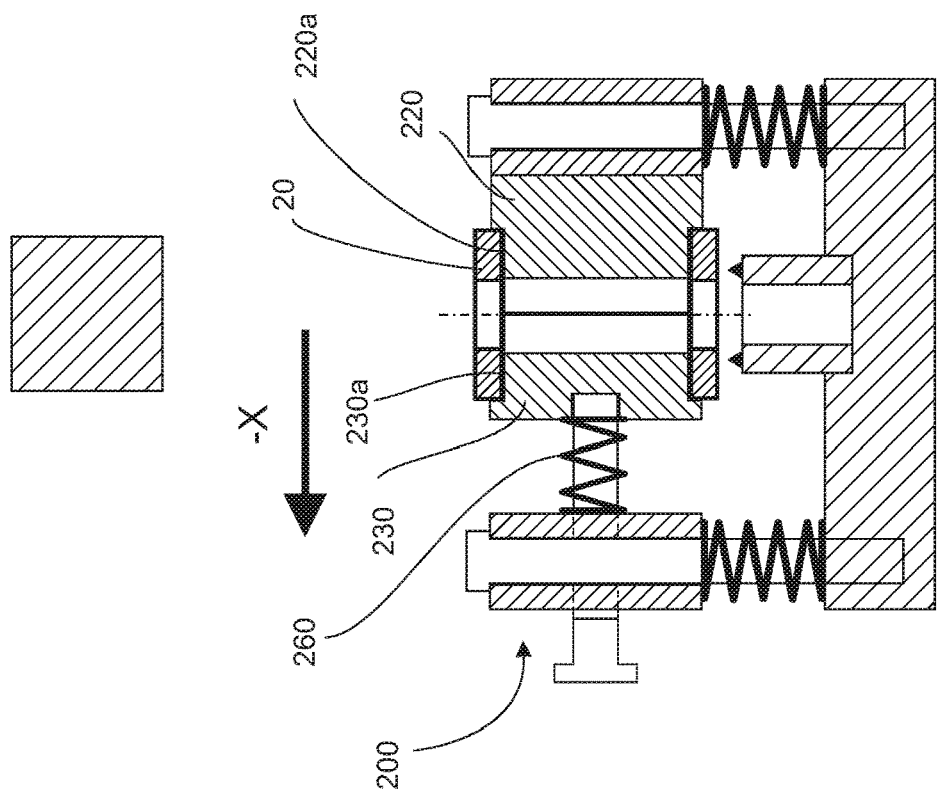

Step 1:

In a first step of the manufacturing process, shown in FIGS. 7A and 8A, the hinge support 20 is inserted (in a direction indicated with arrow V1) in workpiece holder 200 of the manufacturing apparatus 100, respectively the fixed clamping jaw 220 and the second, movable clamping jaw 230. With reference to FIG. 8A the upper edges 29a, 29b, 29c of hinge support 20 are thereby brought in contact (indicated with arrows P) with the respective edges of recess 220a, 230a which may be smaller compared to the geometry of upper edges 29a, 29b, 29c so that the movable clamping jaw 230 is slightly moved in direction –X against the force exerted by springs 260 and to ensure that hinge support 20 is kept in position by the force applied by springs 260. Alternatively, any other contour of the hinge support 20, e.g. bores 23 and the hinge base 22 may be used to ensure proper positioning.

Figure 7B:
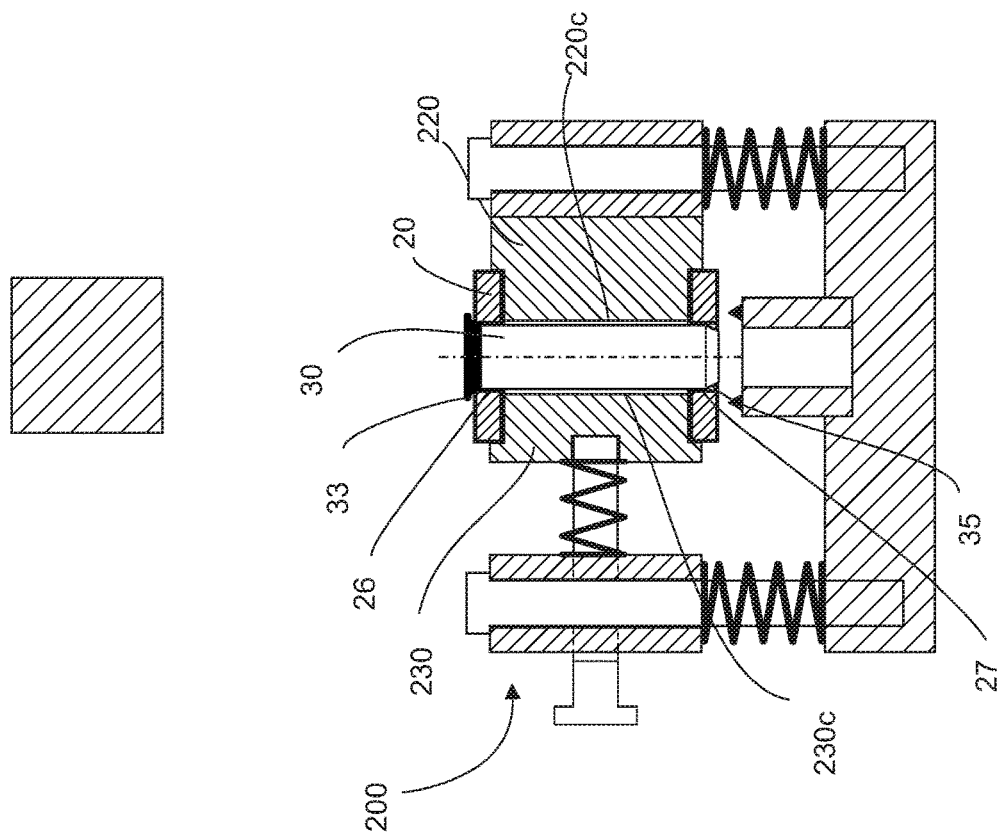

Step 2:

In a second step, shown in FIG. 7B, the hinge bolt 30 is inserted into hinge support 20 guided by semicircular bores 220c, 230c of clamping jaws 220, 230. The protrusion 34 of the hinge bolt 30 thereby stops the insertion of hinge bolt 30 when contacting edges of bolt bore 26 in hinge support 20 on the upper end. The chamfer 35 enables the insertion even if bolt bore 26 and bolt bore 27 are not exactly concentric, as the chamfer 35 is suitably large. During this insertion, the hinge bolt 30 also extends through the semicircular bores 220c, 230c in clamping jaws 220, 230.

Figure 7C:
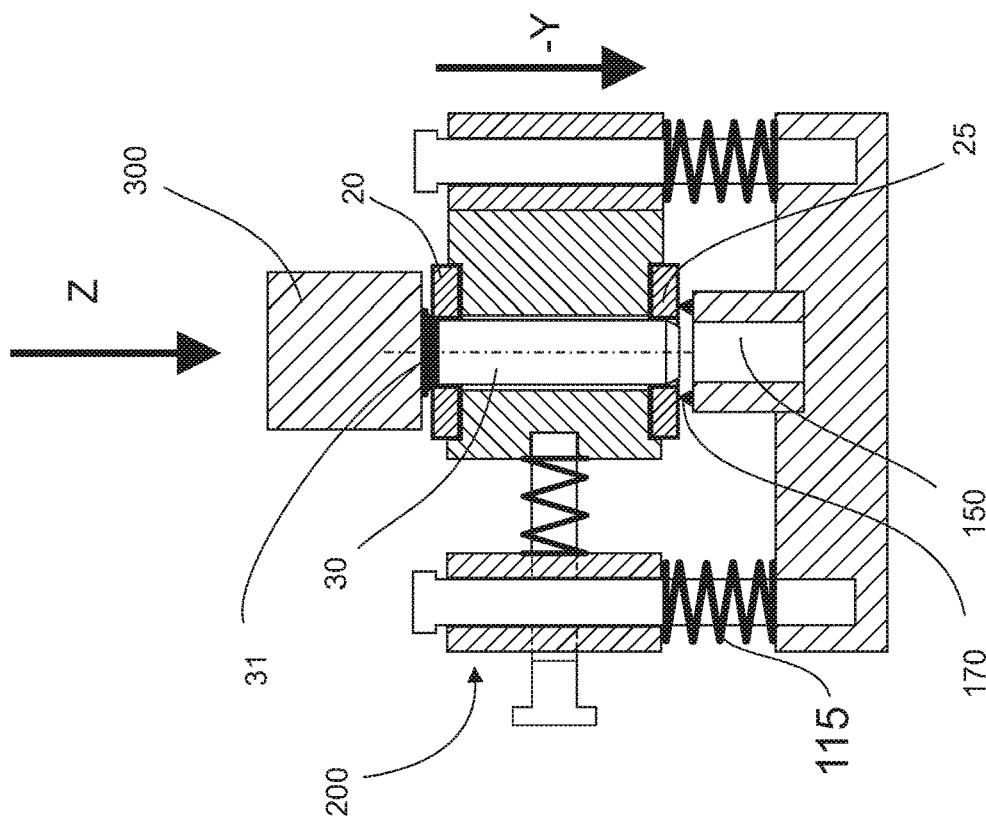

Step 3:

In a third step, shown in FIG. 7C, press piston 300 is moved in direction Z to be brought in contact with bolt head 31.

Figure 7D:
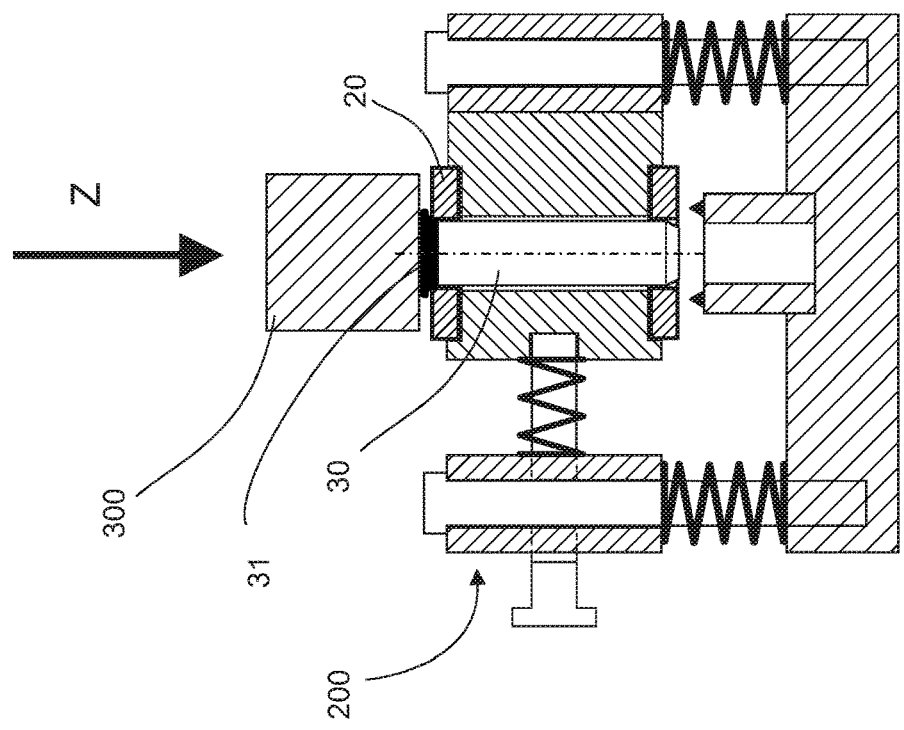

Step 4:

In a fourth step, shown in FIG. 7D, press piston 300 is moved further in direction Z. The force exerted by press piston 300 moves the workpiece holder 200 with hinge support 20 and hinge bolt 30 against the force of spring 115 in direction indicated with arrow –Y so that the lower limb 25 contacts the press contour 170 of tool die 150. In this position and in any preceding steps, the clamping jaws 220, 230 keep both limbs 24, 25 in an initial distance (in direction Y) while the force exerted by press piston 300 is transferred from upper limb 24 via clamping jaws 220, 230 to lower limb 25.

Step 5:

In a fifth step, shown in FIG. 7D, press piston 300 is moved further in direction Z. The force (which may be about 25 to 30 kN) exerted by press piston 300 starts to deform (cold-form) the hinge support 20 as further shown in FIG. 9 which is detailed view W of FIG. 7D. The upper limb 24 is deformed by the main cylindrical portion 32, stepped tapering 33 and protrusion 34 fully immersing into the bolt bore 26 which is initially of cylindrical shape as shown in FIG. 4B. This results in a deformation process which proceeds in three sequences:

Sequence 1: When the protrusion 34 (with a diameter d2 larger than the diameter of bolt bore 26) engages into the bore 26, the low-tensile deformed material of the upper limb 24 is initially forced radially outwards.

Sequence 2: After further downwards movement of the press piston 300, the stepped tapering 33 engages and deformed material of the upper limb 24 is forced back and radially inwards.

Sequence 3: After further downwards movement of the press piston 300, the complete bolt head 31 engages the upper limb 24 and the deformed material is pressed in downwards direction towards the protrusion 34 to fully enclose the bolt head 31, stepped tapering 33 protrusion 34 in a form-fit connection (combined with press-fit connection).

The portion of the hinge bolt 30 engaging in the bolt bore 26 may have any other suitable shape to enable the deformation of upper limb 24 to provide a press-fit connection as described in one or all of the sequence 1 to 3 as described above.

Additionally, the apparatus 100 and described method provide deformation of the lower limb 25 of the hinge support 20. The downwards movement of press piston 300 further in direction Z results in the press contour 170 of tool die 150 deforming the lower limb 25. The bolt bore 27 has an initial diameter greater than the diameter d of main cylindrical portion 32 of hinge bolt 30. As the press contour 170 is tapered towards the lower limb 25, the intrusion of the press contour 170 into lower limb 25 forces the material of the lower limb 25 radially inwards so that the deformed material comes into press-fit connection with the main cylindrical portion 32 of the hinge bolt 30. This ensures a durable connection. If the press-fit connection is not durable enough, the hinge bolt 30 may be provided with a circumferential groove 36 (see also FIG. 5) in which material of the lower limb 25 may be forced to additionally provide a form-fit connection (combined with press-fit connection During STEP 5 semicircular bores 220c, 230c of the fixed clamping jaw 220 and the movable clamping jaw 230 narrowly encloses hinge bolt 30 to avoid that material of the limbs 24, 25 can escape axially into semicircular bores 220c, 230c so that the intended connection is not provided properly.

Step 6:

When the pressing process is finished, a sixth step is provided to take the finished hinge 19 (as shown in FIG. 10) having hinge support 20 and hinge bolt 30 out of the manufacturing apparatus 100 as further shown in FIG. 7F and FIG. 8B. With reference to in FIG. 7F and FIG. 10, the intrusion of the press contour 170 into lower limb 25 during STEP 5 results in an circular indentation 40, This enables an easy visual check that the pressing process was properly performed, especially that the lower limb 25 was adequately deformed and the circular indentation 40 is coaxially aligned with the bolt bore 27 to ensure that the press-fit connection is provided equally distributed around the circumference of main cylindrical portion 32 of the hinge bolt 30. With the press piston 300 moved to an upper position, the workpiece holder 200 is also moved upwards so that the hinge 19 is free of any forces and not in contact with the press contour 170 of tool die 150 or the press piston 300 anymore. If the handle 270 is pulled in direction −X, the movable clamping jaw 230 is moved in the same direction away from the fixed clamping jaw 220. Thereby the semicircular bores 220c of movable clamping jaw 220 is moved so that the enclosure of the hinge bolt 30 is opened to provide a space in between clamping jaw 230 suitable to move the hinge bolt 30 therein. The hinge 19 can then be taken out of workpiece holder 200 of the manufacturing apparatus 100 in a path indicated with arrow V2.

The manufacturing apparatus 100 as described above is suitable for manual placement of the hinge parts. FIG. 11A and FIG. 11B show a further embodiment of process steps as described above to additionally provide automated placement of the hinge bolt 30. Wherein like reference numerals represent like elements of the above described views are used, these are not described in detail again. The manufacturing apparatus 100 may additionally be provided with a bolt feeding system 400 which serves to position the hinge bolt 30 underneath the pressing piston 300 and in initial rough coaxial alignment with bores 26, 27 press piston 300 and press contour 170. The bolt feeding system 400 comprise a positioning device 401 which is movable by a pneumatic drive along a direction indicated with arrow K and a bolt supply 410. Positioning device 401 is provided by two plier halves, each provided with a half bore 402 being of a slightly smaller diameter than the diameter d of main cylindrical portion 32. Both plier halves of the position device 401 can be pneumatically opened and closed along a direction indicated with arrow L (which extends in the drawing plane) to fix and release hinge bolt 30. Bolt supply 410 is provided to supply singulated hinge bolts 30 to the positioning device 401. In this embodiment, the bolt supply 410 mainly contains of a tubular duct 411 through which the hinge bolts are transferred pneumatically from a bolt storage (not shown). The process steps are now described in detail.

The step depicted with FIG. 11A serves to position the hinge bolt 30 underneath the pressing piston 300 and in initial rough coaxial alignment with bores 26, 27 press piston 300 and press contour 170 and could be proceeded prior to, simultaneously with or after STEP 1 as shown with FIG. 7A. This requires a set of sequences which are described below:

Sequence A: The positioning device 401 is positioned underneath the tubular duct 411 of the bolt supply 410 to receive the singulated hinge bolt (indicated with 30'). A further hinge bolt (indicated with 30") may already be retained in the tubular duct 411. For receiving the hinge bolt 30', both plier halves of the positioning device 401 are slightly opened so that the hinge bolt 30' easily passes through the half bores 402 until the bolt head 31 stops further movement. If the hinge bolt 30' is in position, both plier halves 401 are closed for fixation.

Sequence B: The positioning device 401 is then moved along the direction indicated with arrow K to position the hinge bolt 30 underneath the pressing piston 300.

In the next step depicted with FIG. 11B, the hinge bolt 30 is inserted into hinge support 20 in the same way as descripted in FIG. 7B. Therefore, the step described with FIG. 11B is providing the same condition as the step described in FIG. 7B.

In a sequence C, and with the hinge bolt 30 being respectively positioned (with bores 26, 27, press piston 300 and press contour 170), the press piston 300 is moved downwards in a direction indicated with arrow Z and comes into contact with the bolt head 31. As the press piston 300 is provided with an air duct 310 which is connected to a vacuum pump to supply negative pressure and is also coaxially aligned at one end with bolt head 31, the hinge bolt 30 is sucked and fully retained by the press piston. 300.

In sequence D, both plier halves of the position device 401 are fully opened to releases the hinge bolt 30 and to enable the positioning device 401 to be moved along a direction indicated with arrow −K to the position indicated with 401' to receive the hinge bolt 30" for a next pressing process.

The manufacturing apparatus 100 as described above may also include an automated feed system for the hinge support 20 or an automated removal system for the completed hinge 19 as would be understood by one skilled in the art without departing from the scope of the invention. To reduce production, multiple manufacturing apparatuses 100 may be arranged in a carousel arrangement that rotates. A first manufacturing apparatus 100' may then be provided to insert the components prior to pressing while a second manufacturing apparatus 100" is in a position under the press piston

300 to proceed the pressing and a third manufacturing apparatus 100′′′ is provided to take the finished, pressed hinge 19 out of the apparatus. BY rotating these apparatuses 100′, 100′′, 100′′′ the insertion of the components, the pressing and the removal of the finished hinge can be provided simultaneously by human operator or suitable handling devices.

The process according the invention has the major advantages that the both limbs are connected simultaneously in a cold-forming process, whereby the press force are relatively low as the low-tensile material of the hinge support 20 is deformed while the hinge bolt is not. Furthermore, the manufacturing apparatus 100 is very simple and any movements within the process are exerted by one source, the press piston 300.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

The invention claimed is:

1. A method for forming a hinge having a two-shear connection using a manufacturing apparatus, the hinge having a hinge bolt and a U-shaped hinge support with a hinge base, an upper limb and a lower limb, with the upper limb having a bolt bore, and the lower limb having a bolt bore, the hinge bolt engaging the limbs through bolt bores, the hinge bolt having a main cylindrical portion and at one end a bolt head, wherein the bolt head has a greater diameter compared to a diameter of the main cylindrical portion, wherein from the bolt head, the hinge bolt has a stepped tapering, the cylindrical portion further having a protrusion extending radially with a greater diameter compared to the diameter of the main cylindrical portion, the method comprising: placing the hinge support in a manufacturing apparatus comprising a support base, a workpiece holder, a tool die which includes a tubular die support and a press contour, the support base further including at least one cylindrical guide shaft provided to movably guide the workpiece holder along a second axis; inserting the hinge bolt into the hinge support, guided by the workpiece holder, until the protrusion of the hinge bolt stops the insertion of hinge bolt by contacting edges of the bolt bore in the upper limb of the hinge support; moving the press piston along a first axis so that it contacts the bolt head; moving the press piston further along the first axis such that force exerted by the press piston moves the workpiece holder with the hinge support and the hinge bolt mounted thereon against the force of at least one spring along the second axis so that the lower limb contacts the press contour of the tool die; deforming the upper limb of the hinge support by further moving the press piston along the first axis such that the upper limb is deformed by at least one of the bolt head, the cylindrical portion, the stepped tapering and the protrusion; and simultaneously deforming the lower limb of the hinge support with downwards movement of the press piston such that the press contour of tool die deforms the lower limb, with bolt bore having an initial diameter greater than the diameter of the main cylindrical portion of the hinge bolt, and the press contour being tapered towards the lower limb to force deformed material of the lower limb radially inwards so that the deformed material comes into press-fit connection with the main cylindrical portion of the hinge bolt.

2. The method of claim 1, wherein as part of placing the hinge support in the workpiece holder of the manufacturing apparatus, the workpiece holder is provided with a fixed clamping jaw and a movable clamping jaw.

3. The method of claim 2, wherein the hinge support is placed relative the workpiece holder such that upper edges 29a, 29b, 29c of the upper limb of the hinge support are brought into contact with a first recess 220a in the fixed clamping jaw and a second recess in the movable clamping jaw.

4. The method of claim 2, wherein the hinge bolt into the hinge support guided by a semicircular bore in the fixed clamping jaw and a semicircular bore in the movable clamping jaw.

5. The method of claim 2, wherein as part of placing the hinge support in the workpiece holder of the manufacturing apparatus, moving the movable clamping jaw in a direction along a third axis against a force exerted by at least one spring to ensure that hinge support is kept in position by a biasing force applied by the at least one spring.

6. The method of claim 1 wherein bolt bore in the upper limb has a different diameter than the bolt bore in the lower limb [25].

7. The method of claim 1 wherein the workpiece holder is forced in an upwards direction by four first springs, each engaging one of the guide shafts, and kept in the upwards direction by guide shaft head 110a having a larger diameter then a guide portion of guide shaft.

8. The method of claim 1 wherein the workpiece holder releasably fixes the hinge support during the manufacturing process, the workpiece holder being provided with a main frame part, wherein a first portion of the frame part is provided to take the fixed clamping jaw and the movable clamping jaw is movably assembled to a second portion of the frame part, wherein the first portion and the second portion are connected via a transverse portion of the frame part.

9. The method of claim 1 wherein second recesses 220b, 230b are provided on the opposite side with a geometry slightly larger than a geometry of recesses 220a, 230a to account for the upper and lower limbs of hinge support not being exactly aligned such that lower edges 29d, 29e, 29f do not exactly align with upper edges 29a, 29b, 29c.

10. The method of claim 1 wherein the fixed clamping jaw and the movable clamping jaw are additionally provided with semicircular bores 220b, 230e through which hinge bolt is extended.

11. The method of claim 1 wherein when deforming the upper limb of the hinge support by further moving the press piston along the axis such that the upper limb is deformed by the main cylindrical portion, the stepped tapering and the protrusion, the deformation proceeds in three steps, such that when the protrusion engages into the bore, deformed material of the upper limb is initially forced radially outwards, then after further downwards movement, the stepped tapering engages and deformed material of the upper limb is forced back and radially inwards, and after further downwards movement, the cylindrical portion and thereby the complete bolt head engages the upper limb and deformed material is pressed downwards towards the protrusion to enclose the bolt head in a form-fit connection.

* * * * *